United States Patent
Hatta et al.

(10) Patent No.: US 10,289,564 B2
(45) Date of Patent: May 14, 2019

(54) COMPUTER AND MEMORY REGION MANAGEMENT METHOD

(71) Applicant: HITACHI, LTD., Tokyo (JP)

(72) Inventors: Yukari Hatta, Tokyo (JP); Norimitsu Hayakawa, Tokyo (JP); Takao Totsuka, Tokyo (JP); Toshiomi Moriki, Tokyo (JP); Satoshi Kinugawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/741,704

(22) PCT Filed: Jul. 8, 2015

(86) PCT No.: PCT/JP2015/069628
§ 371 (c)(1),
(2) Date: Jan. 3, 2018

(87) PCT Pub. No.: WO2017/006458
PCT Pub. Date: Jan. 12, 2017

(65) Prior Publication Data
US 2018/0203805 A1 Jul. 19, 2018

(51) Int. Cl.
*G06F 12/00* (2006.01)
*G06F 12/109* (2016.01)
(Continued)

(52) U.S. Cl.
CPC ........ *G06F 12/109* (2013.01); *G06F 9/45558* (2013.01); *G06F 9/50* (2013.01);
(Continued)

(58) Field of Classification Search
CPC ...... G06F 12/109; G06F 9/45558; G06F 9/50; G06F 9/54; G06F 9/541; G06F 9/544; G06F 11/08; G06F 9/45545; G06F 2212/151
See application file for complete search history.

(56) References Cited

U.S. PATENT DOCUMENTS 10,007,497 B2 * 6/2018 Eltsin .................. G06F 11/0712
10,146,572 B1 * 12/2018 Weddington ........ G06F 9/45558
(Continued)

FOREIGN PATENT DOCUMENTS

JP 11-149385 A 6/1999
JP 2001-243080 A 9/2001
(Continued)

OTHER PUBLICATIONS

Written Opinion Box No. V of the International Application No. PCTJP2015/069628.
(Continued)

*Primary Examiner* — Matthew Bradley
(74) *Attorney, Agent, or Firm* — Volpe and Koenig, P.C.

(57) ABSTRACT

A computer on which OSs run is coupled to the storage apparatus, the OSs include a first OS controlling access to the storage apparatus and a second OS generating a virtual computer. A logically divided computer resources are allocated to the first OS and the second OS respectively. A third OS for executing an application runs on the virtual computer. The second OS has a shared region management part managing a shared region that is a memory region used for communication between the application and the first OS. The third operating system has an agent requesting the second operating system to secure the shared region based on a request from the application and mapping the secured shared region to a guest virtual address space.

8 Claims, 6 Drawing Sheets

(51) Int. Cl.
   *G06F 9/50*      (2006.01)
   *G06F 9/54*      (2006.01)
   *G06F 9/455*     (2018.01)
   *G06F 11/08*     (2006.01)
(52) U.S. Cl.
   CPC ........... *G06F 9/54* (2013.01); *G06F 9/541* (2013.01); *G06F 9/544* (2013.01); *G06F 11/08* (2013.01); *G06F 9/45545* (2013.01); *G06F 2009/45583* (2013.01); *G06F 2212/1044* (2013.01); *G06F 2212/151* (2013.01); *G06F 2212/152* (2013.01); *G06F 2212/657* (2013.01)

(56) References Cited

U.S. PATENT DOCUMENTS

| | | |
|---|---|---|
| 2001/0029550 A1 | 10/2001 | Endo et al. |
| 2011/0022832 A1 | 1/2011 | Motohama et al. |
| 2015/0046924 A1 | 2/2015 | Ports et al. |

FOREIGN PATENT DOCUMENTS

| | | |
|---|---|---|
| JP | 2004-258698 A | 9/2004 |
| WO | 2009/113394 A1 | 9/2009 |

OTHER PUBLICATIONS

International Search Report dated Oct. 13, 2015 of the International Application No. PCTJP2015/069628.

* cited by examiner

| BLOCK ID 301 | GUEST PHYSICAL ADDRESS 302 | HOST PHYSICAL ADDRESS 303 | SIZE 304 | ALLOCATION STATUS 305 |
|---|---|---|---|---|
| 0 | aaaaaaaa | xxxxxxxx | 1kB | ON |
| 1 | aaaaaaab | xxxxxxxy | 1kB | OFF |
| ⋮ | ⋮ | ⋮ | ⋮ | ⋮ |

COMPUTER AND MEMORY REGION MANAGEMENT METHOD

BACKGROUND OF THE INVENTION

The present invention relates to a management method for a memory region shared by a host OS and a guest OS managed by the host OS or another host OS in a computer system in which a plurality of host OS run.

In recent years, as a means to effectively utilize the hardware resource in a physical computer, the technology of running two or more OS (operating system) in one physical computer is drawing attention (see Japanese Patent Application Laid-open Publication No. H11-149385 and WO/2009/113394, for example).

Japanese Patent Application Laid-open Publication No. H11-149385 describes "a multi-operating system computer configured to alternately operate to activate an active OS, a first OS (operating system) that executes a plurality of tasks with different priorities in the order of the priority levels and a second OS differing from the first OS as active OS, comprising an OS switching part configured to switch the active OS from the first OS to the second OS when a task that is a prescribed task with a priority among the plurality of tasks and that is used as a switching trigger task for identifying a timing of switching of the active OS is executed while the first OS is running as the active OS."

WO/2009/113394 describes that Multi-OS boot device includes the first operating system (Operating System, hereinafter referred to as OS) in the multi-OS starting device for starting the at least two of the OS and the second OS, (1) a memory area, and the primary storage unit in which memory space is defined with respect to the memory area, (2) a second boot loader, a secondary storage unit for storing a second OS, (3) CPU and the fast boot loader operating under the first OS to a context of a control information operates in the first context is a context for the first OS to the (Central Processing Unit) By operating under said first OS running in the first context, with respect to the primary storage device by said first context as a first memory space for the first OS to manage and the OS execution unit to the memory area of the defined the primary storage unit from the secondary storage unit to load and said second OS and the second boot loader on the first boot loader, (4) said first one of said second and OS by executing the second boot loader loaded in the defined memory area as the memory space based on the first OS running in the first context wherein There defining a third memory space where the second of the memory areas is defined as a memory space the second boot loader and the second OS to be managed and a loaded memory area to the primary storage unit and let switch the context for the second boot loader from the second boot loader on the first context to context for the second boot loader, which is generated with generating, by executing the second boot loader in the original context for the second boot loader said second of said second OS loaded into the memory area of the primary storage unit in the memory area of which is defined said primary storage unit by the first boot loader as a memory space included in the third memory space said together to load the second boot loader to generate a context for the second OS, to generated the second context for OS let switching from the context for the second boot loader, the context for the second OS and characterized in that it comprises a loader executing unit for executing the activation of the second OS on the second boot loader under.

With this multi-OS technology, by installing a host OS1 as the first OS (host OS1), installing a hypervisor as the second OS (host OS2), and installing server control OSs as the OSs (guest OS1 to guest OSn) for a plurality of logical computers on the hypervisor, for example, the space and price of the device can be reduced.

SUMMARY OF THE INVENTION

The following descriptions are made for an example of a computer system in which one physical computer is connected to a non-volatile memory medium, and the physical computer includes a host OS1 that controls access to the non-volatile memory medium and a host OS2 that controls a plurality of guest OSs.

Each guest OS includes a memory for caching data, which improves the response capability in the I/O process. Because the memory is volatile, the host OS1 or the host OS2 move data to the non-volatile memory medium so that data is not lost even if power is accidentally shut down. In a case where the power is restored and the guest OS is rebooted, in order to restore the data to the memory, an application on the guest OS needs to communicate with the host OS1, which can access the non-volatile memory medium, and write back the data output from the host OS1 to the memory.

In order to realize such a disaster recovery process, it is necessary to secure a memory region (a shared region) to be used for the communication between the host OS1 and the application on the guest OS.

The present invention provides a computer that can secure a memory region used for communication control between a virtual computer managed by one host OS and the one host OS or another host OS in a computer that runs a plurality of host OSs each having independent computer resources, and a management method for the memory region.

A typical example of the invention disclosed in the present application is as follows. That is, provided is a computer on which a plurality of operating systems run, comprises, as computer resources, a processor, a memory coupled to the processor, and an I/O device coupled to the processor. The computer is coupled to a storage apparatus having a plurality of storage media. The plurality of operating systems includes a first operating system configured to control access to the storage apparatus and a second operating system configured to generate at least one virtual computer. Divided computer resources are allocated to the first operating system and the second operating system respectively. A third operating system for executing an application runs on the at least one virtual computer. The second operating system has a shared region management part configured to manage a shared region that is a memory region used for communication between the application and the first operating system. The third operating system has an agent configured to request the second operating system to secure the shared region based on a request from the application and map the secured shared region to a guest virtual address space indicating a position of a virtual memory allocated to the application.

The plurality of operating systems can share a memory region, and exchange data with each other using the memory region. Problems, configurations, and effects other than described above will become apparent from a description of an embodiment below.

BRIEF DESCRIPTION OF THE DRAWINGS

The present invention can be appreciated by the description which follows in conjunction with the following figures, wherein.

DETAILED DESCRIPTION OF THE EMBODIMENTS

Below, an embodiment of the present invention will be explained with reference to the figures.

Embodiment 1

Figure 1:
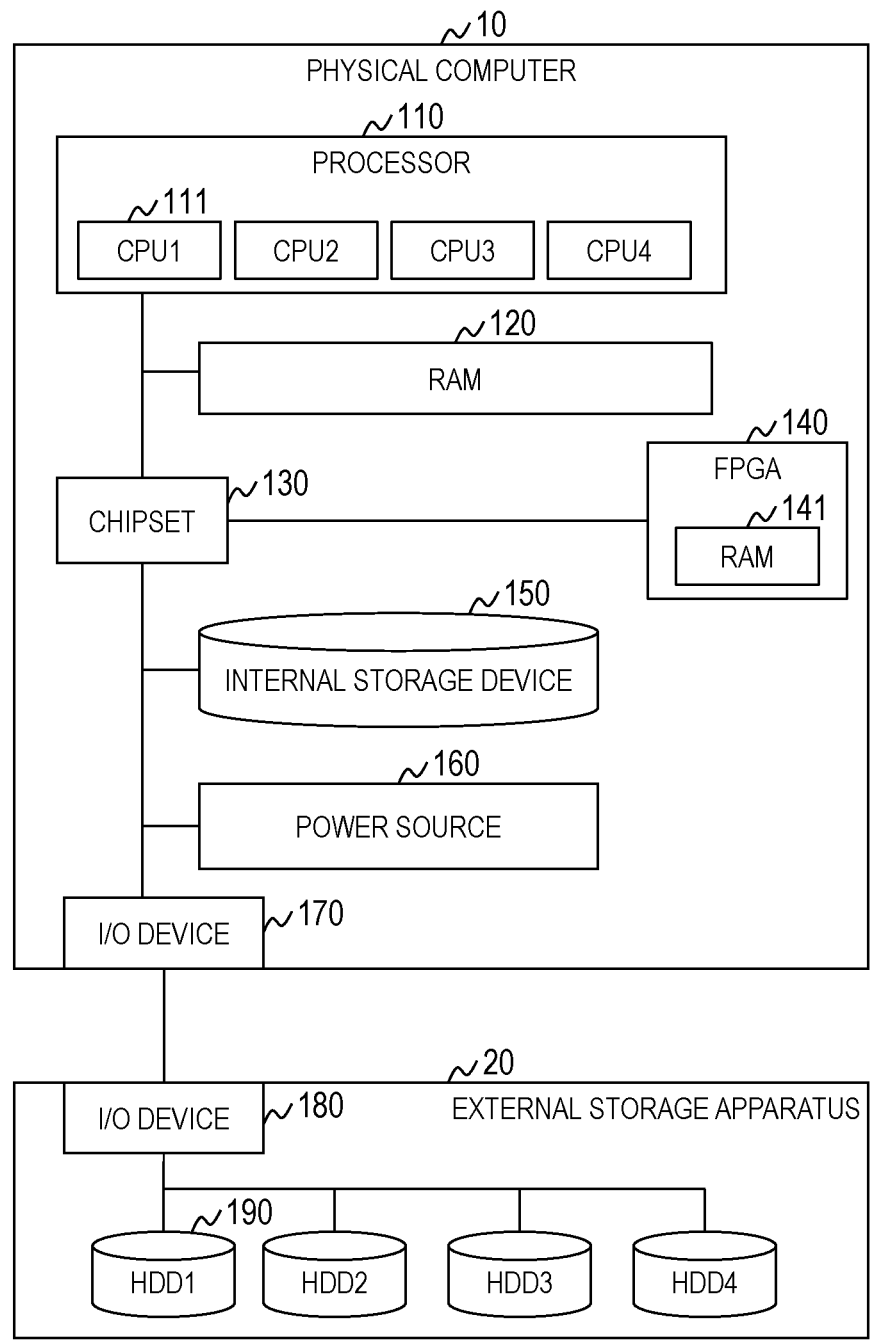
FIG. 1 is a diagram showing one example of the hardware configuration of a computer system of Embodiment 1.

FIG. 1 is a diagram showing one example of the hardware configuration of a computer system of Embodiment 1.

The computer system includes a physical computer 10 and an external storage apparatus 20. The physical computer 10 is connected to the external storage apparatus 20 directly or via a network. Examples of the network include SAN composed of FC (fibre channel).

The physical computer 10 includes a processor 110, a RAM 120, a chipset 130, an FPGA 140, an internal storage device 150, a power source 160, and an I/O device 170.

The processor 110 reads out a program (command) stored in the RAM 120, and executes the program (command). The processor 110 has a plurality of CPU cores 111. By the processor 110 executing programs, functions such as OS are realized. In the descriptions below, when a process is executed by a certain program, it means that the program is executed by the processor 110.

The RAM 120 stores the programs to be executed by the processor 110, and information necessary for executing the programs. The RAM 120 also includes a work area of each program.

The chipset 130 manages input and output of data between the processor 110, the RAM 120, and the I/O device 170. The FPGA 140 is a circuit executing prescribed calculations. In this embodiment, the FPGA 140 is configured to execute data transfer and the like. The FPGA 140 includes a RAM 141.

The internal storage device 150 is a non-volatile memory medium, and examples thereof include an HDD (hard disk drive) or SSD (solid state drive). In this embodiment, when the power is accidentally shut down, the data stored in the RAM 141 is stored in the internal storage device 150. The data stored in the RAM 120 may also be stored in the internal storage device 150.

The power source 160 controls power of the physical computer 10. The I/O device 170 is a device, by connecting an external device, to receive information from outside and output information to outside. Example of the I/O device 170 include NIC, FC, HBA, and the like.

The external storage apparatus 20 stores therein programs of the OS, program codes for various applications that run on the OS, data handled by the applications, and the like. The external storage apparatus 20 includes a plurality of storage media. In this embodiment, the external storage apparatus 20 includes four HDDs 190 as the storage media.

The physical computer 10 may be connected to a storage system including a plurality of storage media and a controller.

Figures 2, 3:
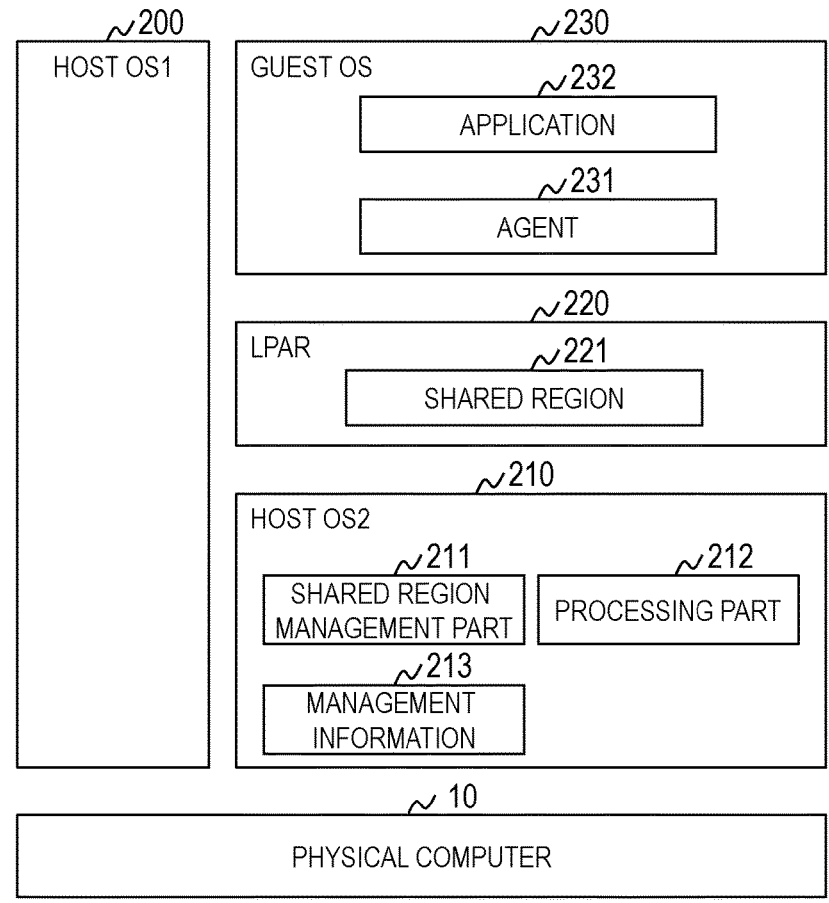
FIG. 2 is a diagram showing one example of the logical configuration of the computer system of Embodiment 1.
FIG. 3 is a diagram for explaining one example of management information of Embodiment 1.

FIG. 2 is a diagram showing one example of the logical configuration of the computer system of Embodiment 1.

In the computer system of this embodiment, the computer resources of the physical computer 10 is divided, and the divided computer resources are respectively allocated to the host OS1 (200) and the host OS2 (210). The computer resources include the RAM 120. In this embodiment, the memory region (storage region) of the RAM 120 is divided into two parts, and each of divided memory regions is allocated to the host OS1 (200) and the host OS2 (210) respectively. In the descriptions below, a divided memory region will also be referred to as a divided RAM.

The computer resources allocated to the host OS1 (200) are exclusively used by the host OS1 (200), and the computer resources allocated to the host OS2 (210) are exclusively used by the host OS2 (210).

The host OS1 (200) of this embodiment corresponds to a storage control OS. The storage control OS controls the reading process and writing process for the external storage apparatus 20. The host OS1 (200) executes the back-up process and restoration process between the guest OS 230 and the internal storage device 150.

The host OS2 (210) of this embodiment corresponds to a VMM (virtual machine monitor) such as a hypervisor and like. The VMM generates at least one virtual computer (LPAR 220) using a part of the computer resources allocated to the host OS2 (210) with the virtual machine technology, and activates the guest OS 230 on the generated LPAR 220. An application 232 executing a certain process also runs on the guest OS 230.

The host OS2 (210) manages mapping between a host physical address space of the divided RAM allocated to the host OS2 (210) and a guest physical address space of a logical RAM allocated to the LPAR 220.

The host physical address space of the divided RAM is address space indicating the physical location of the divided RAM. The guest physical address space of the logical RAM is address space indicating the physical location of the logical RAM. The host OS1 (200) also manages the host physical address of the divided RAM allocated thereto.

The guest OS 230 manages mapping between the guest physical address space of the logical RAM and a guest virtual address space of the logical RAM. The guest virtual address space is address space indicating the location of a virtual RAM allocated to the application 232 by the guest OS 230.

The LPAR 220 includes a logical processor, the logical RAM (logical memory), and a logical I/O device. The host OS2 (210) of this embodiment allocates a shared region 221 to the LPAR 220. The shared region 221 is a memory region used for the communication between the application 232 and the host OS1 (200) and the like.

The host OS2 (210) of this embodiment includes a shared region management part 211 and a processing part 212, and holds management information 213.

The shared region management part 211 allocates the shared region 221 to the LPAR 220, and manages the shared region 221. The shared region management part 211 divides the shared region 221 to a plurality of blocks, and manages the status of the shared region 221 by block unit. In the descriptions below, the shared region 221 by block unit will also be simply referred to as a block. The processing part 212 controls the communication between the host OS1 (200) and the guest OS 230 using the shared region 221. The management information 213 is information to manage the shared region 221, and managed by the shared region management part 211. The management information 213 will be explained in detail using FIG. 3.

The guest OS 230 of this embodiment includes an agent 231. The agent 231 hands over a request regarding the shared region 221 issued by the application 232 to the host OS2 (210), and also requests the host OS2 (210) to secure the shared region 221. The agent 231 also maps on the secured shared region 221 to a virtual address space, and responses a virtual address to which the shared region 221 is mapped to the application 232. This makes it possible for the application 232 to use the shared region 221.

FIG. 3 is a diagram for explaining one example of the management information 213 of Embodiment 1.

The management information 213 includes a block ID 301, a guest physical address 302, a host physical address 303, a size 304, and an allocation status 305.

The block ID 301 is an Identification number of a block. The guest physical address 302 is a start address of a block in the guest physical address space. The host physical address 303 is a start address of a block in the host physical address space. The size 304 is the size of a block. In this embodiment, all blocks are the same size, but each of blocks may have a different size.

The allocation state 305 is the information indicating whether a block is allocated to the application 232 or not. Either "ON" or "OFF" is set in the allocation state 305 of this embodiment. In a case where the allocation state 305 is "ON," it indicates that a block is allocated to the application 232. In a case where the allocation state 305 is "OFF," it indicates that a block is not allocated to the application 232.

In this embodiment, one shared region 221 is allocated to one LPAR 220. Thus, the host OS2 (210) holds the same number of management information 213 as the LPAR 220.

Figure 4:
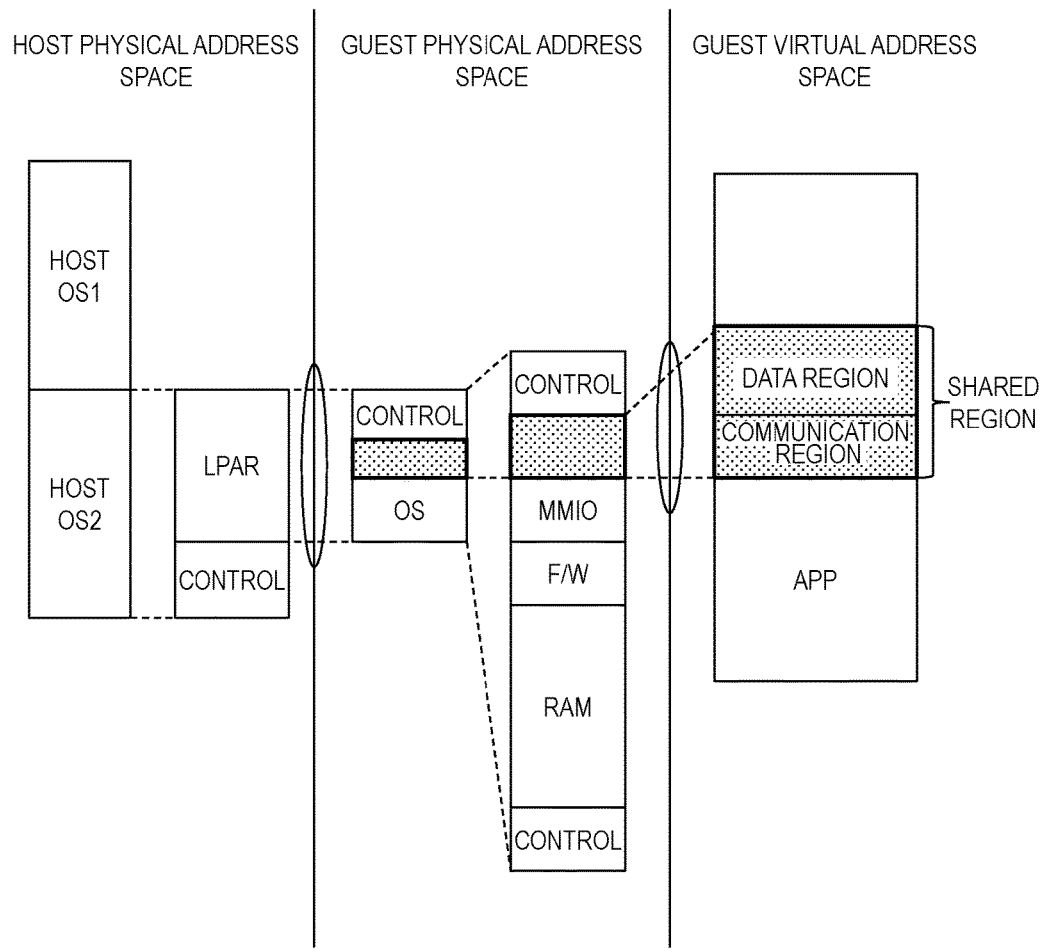
FIG. 4 is a diagram showing mapping relation and structure of a shared region of Embodiment 1.

FIG. 4 is a diagram showing the mapping relation and structure of the shared region of Embodiment 1.

The memory region of the RAM 120 of the physical computer 10 is divided into two parts, and each of the divided memory regions is allocated to the host OS1 and the host OS2. The host OS1 (200) and the host OS2 (210) each manage the allocated memory region as an independent host physical address space.

The host OS2 (210) secures a part of the allocated memory region as a control region for the host OS2 (210). The host OS2 (210) also secures a part of the allocated memory region as a region for the LPAR 220, and allocates that region to the LPAR 220.

The LPAR 220 divides the region for the LPAR 220 into a region for the guest OS 230 and a control region for the LPAR 220. The region for the guest OS 230 includes MMIO region, F/W region, RAM region, and a control region for the guest OS 230.

The host OS2 (210) allocates the shared region 221 to the control region for the LPAR 220 when the LPAR 220 is activated. That is, a part of the control region for the LPAR 220 is used for the shared region 221. A data structure of the shared region 221 is constructed by a data region and a communication region. The data region is a memory region for storing data transmitted by the host OS1 (200) in order to execute data restoration using the data backed up by the host OS1 (200). The communication region is a memory region used for the communication between the application 232 and the host OS1 (200).

The data structure of the shared region 221 shown in FIG. 4 illustrates the logical structure. Thus, the data region and the communication region may not to be continuous memory regions. By allocating the shared region 221 upon normal activation, the host OS2 (210) and the application 232 can share a memory, for example.

As shown in FIG. 4, the shared region 221 differs from the region of the guest OS 230, and is a memory region that is not recognized as logical RAM by the guest OS 230. The shared region 221 is included in the memory region allocated to the host OS2, and is therefore not accessed by the host OS1 (200) except for the communication with the application 232.

Figure 5A:
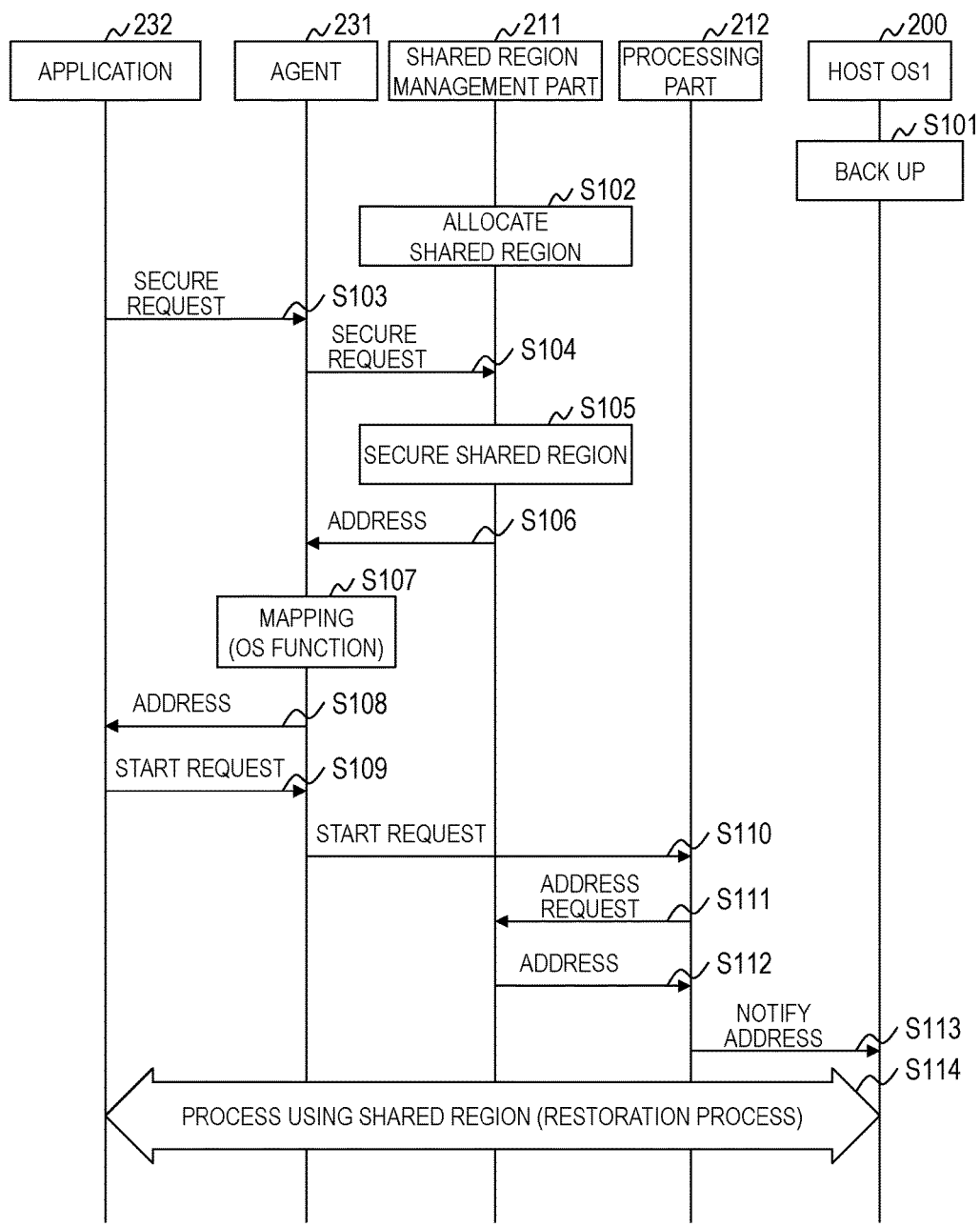
FIGS. 5A and 5B are sequence diagrams showing the flow of the process using the shared region of the computer system of Embodiment 1.
Figure 5B:
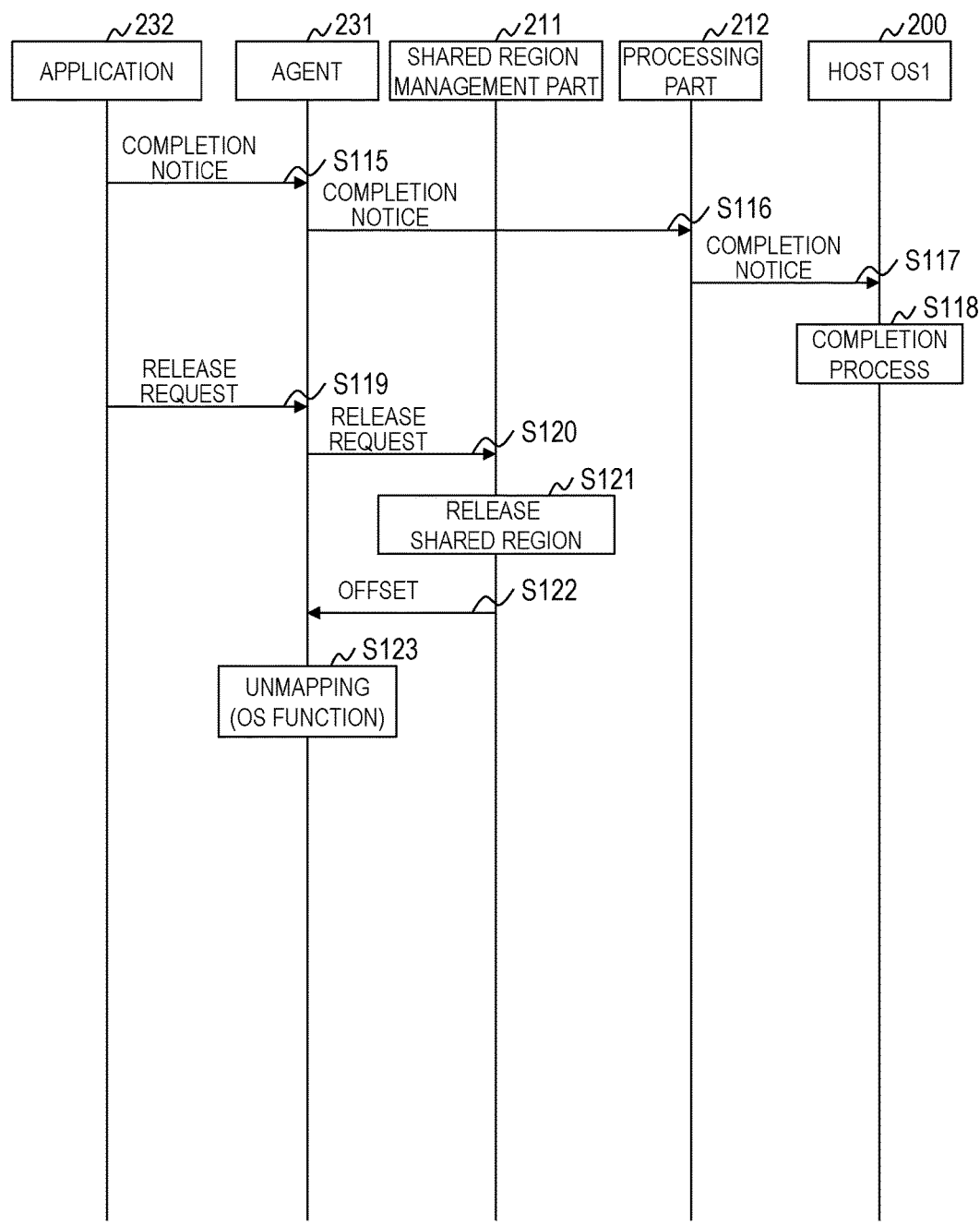

FIGS. 5A and 5B are sequence diagrams showing the flow of the process using the shared region 221 of the computer system of Embodiment 1. In this embodiment, as one example of the process using the shared region, a restoration process using the shared region will be explained.

The host OS1 (200) backs up the data, which is stored in the RAM 120 for caching, to the external storage apparatus 20 when power is shut down due to a failure of the power source part 160 of the physical computer 10 and the like (Step S101). Thereafter, the physical computer 10 performs reboot.

The shared region management part 211 of the host OS2 (210) allocates the shared region 221 to the LPAR 220 when the LPAR 220 is activated (Step S102).

For example, when the LPAR 220 is activated, the shared region management part 211 secure a region for the shared region 221 from the control memory region for the LPAR 220, which is a part of the memory region allocated to the LPAR 220.

The shared region management part 211 secures memory regions with consecutive addresses of the host physical address space as the shared region 221. The shared region management part 211 divides the secured memory region into respective blocks, and assigns an identification number to each of the blocks.

The shared region management part 211 generates an entry for each of the blocks in the management information 213, and sets the assigned identification number to the block ID 301. The shared region management part 211 also sets the start address of each of the blocks in the host physical address 303 of each of the entries, and sets the size of each of the blocks in the size 304. The shared region management part 211 also sets "OFF" in the allocation status 305 of each of the entries.

When the LPAR 220 is activated, the shared region management part 211 obtains the guest physical address and the host physical address of each of the bocks based on the address of the secured memory region, and sets the obtained guest physical address and the host physical address in the guest physical address 302 and the host physical address 303 of each of the entries. The process of Step S102 is executed as described above.

After the LPAR 220 is activated, and then the guest OS 230 is activated on the LPAR 220, the process of the application 232 is started. The application 232 determines whether the back-up process has been executed or not. This determination process may be executed by sending an inquiry to the host OS1 (200) via the host OS2 (210), for example. In this example, the application 232 determines that the back-up process has been executed.

In this case, the application 232 issues a secure request for the shared region 221 to the agent 231 (Step S103). This secure request includes a size of a memory region to be secured.

The agent 231 sends the secure request for the shared region 221, which was received from the application 232, to the shared region management part 211 (Step S104).

In a case of receiving the secure request for the shared region 221 from the agent 231, the shared region management part 211 refers to the management information 213 to secure the shared region 221 (block) which allocates to the guest virtual address space of the application 232 (Step S105). That is, at least one block to be provided to the application 232 is selected. The shared region management part 211 also notifies the agent 231 of the guest physical address to be mapped (Step S106).

Specifically, the shared region management part 211 refers to the allocation status 305 of each entry of the management information 213, and searches a region where a plurality of entries with the management information 213 being "OFF" are lined up consecutively for the requested size. The shared region management part 211 selects the group of entries, and sets the allocation status 305 of the selected group of entries to "ON". The shared region management part 211 notifies the agent 231 of the values stored in the block ID 301 and the guest physical address 302 of a head entry of the selected group of entries. The addresses given by the shared region management part 211 to the agent are the addresses for mapping, and therefore, the shared region management part 211 also notifies the agent with the offset amount from the region to be used by the application 232.

In a case of receiving the guest physical addresses from the shared region management part 211, the agent 231 maps the guest physical addresses to the guest virtual address space (Step S107). In this embodiment, the guest physical addresses are mapped to the guest virtual addresses using the OS function. The specific process will be explained with reference to FIG. 6.

The agent 231 notifies the application 232 of the mapped guest virtual addresses (Step S108).

Specifically, the agent 231 notifies the application 232 of the information necessary to release the secured shared region such as the guest virtual address, the guest physical address, the file descriptor, the identification number, and the size of a head block used by the application 232, based on the mapping result and the offset information.

In a case of receiving the guest physical addresses from the agent 231, the application 232 issues a start request for a process to the host OS2 (210), the process is used the shared region 221 so as to start the communication with the host OS1 (200) (Step S109). The start request includes the size, which is included in the secure request for the shared region 221 issued in Step S103, and the identification number of the block received from the agent 231.

The agent 231 issues the start request for the process received from the application 232 to the processing part 212 (Step S110).

In a case of receiving the start request for the process from the agent 231, the processing part 212 requests for the host physical addresses of the secured blocks to the shared region management part 211 (Step S111). A request to obtain the host physical addresses includes the block ID number, which was issued in Step S108 and input through the start request in Step S109.

In a case of receiving the request to obtain the host physical addresses, the shared region management part 211 notifies the processing part 212 of the host physical addresses of the secured blocks, based on the management information 213 (Step S112).

Specifically, the shared region management part 211 refers to the management information 213 to search for an entry that has a block ID 301 matching the identification number of the block included in the request to obtain the host physical addresses. The shared region management part 211 notifies the processing part 212 of the address stored in the host physical address 303 of the retrieved entry.

In a case of receiving the host physical addresses from the shared region management part 211, the processing part 212 notifies the host OS1 (200) of the host physical address (Step S113). The processing part 212 also notifies the host OS1 (200) of the size included in an input of the start request in Step S109. This allows the host OS1 (200) to access the shared region 221 allocated to the application 232.

In a case of receiving a notification of the host physical addresses, the host OS1 (200) executes a process using the shared region 221 (Step S114). In this embodiment, a restoration process using the shared region 221 is executed. The restoration process is a known process, and is not described in detail here.

After the restoration process is completed, the application 232 issues a completion notice to the agent 231 (Step S115). The agent 231 issues the completion notice received from the application 232 to the processing part 212 (Step S116).

In a case of receiving the completion notice from the agent 231, the processing part 212 issues the completion notice to the host OS1 (200) (Step S117).

In a case of receiving the completion notice from the processing part 212, the host OS1 (200) executes a completion process so that the shared region 221 is no longer accessed (Step S118). The completion process is a known process, and is not described in detail here.

The application 232 issues a release request to the agent 231 (Step S119). This release request includes the various types of information received by the agent 231 in Step S108. The agent 231 issues the release request received from the application 232 to the shared region management part 211 (Step S120).

In a case of receiving the release request from the agent 231, the shared region management part 211 release all of the blocks allocated to the application 232 (Step S121). The shared region management part 211 refers to the management information 213 to update the allocation status 305 of the entries corresponding to the released blocks to "OFF."

The shared region management part 211 notifies the agent 231 of an offset to calculate addresses for unmapping (Step S122).

In a case of receiving the offset from the shared region management part 211, the agent 231 unmaps the blocks from the guest virtual address space using the offset (Step S123).

Figure 6:
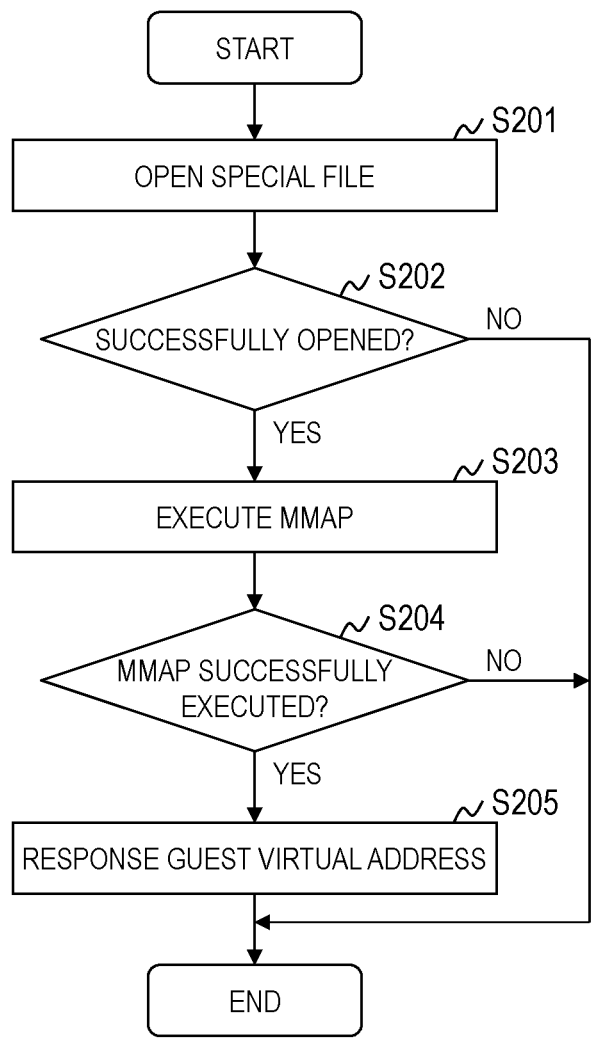
FIG. 6 is a flowchart for explaining one example of the mapping process executed by an agent of Embodiment 1.

FIG. 6 is a flowchart for explaining one example of the mapping process executed by the agent 231 of Embodiment 1.

The agent 231 performs to open a special file (Step S201). The agent 231 determines whether the special file was successfully opened (Step S202).

In a case where it is determined that the special file was not successfully opened, the agent 231 determines an error, and terminates the process. In a case where it is determined that the special file was successfully opened, the agent 231 executes mmap to map the guest physical addresses of the blocks to the guest virtual addresses (Step S203). The agent 231 determines whether mmap was successfully executed or not (Step S204).

In a case where it is determined that the mmap was not successfully executed, the agent 231 determines an error, and terminates the process. In a case where it is determined that the mmap was successfully executed, the agent 231 responses the guest virtual addresses to the application 232 as the execution result of mmap (Step S205).

In a case where the shared region 221 is to be unmapped, the agent 231 executes munmap.

As described above, according to this embodiment, in a computer that runs the host OS1 (200) and the host OS2 (210), which respectively have independent computer resources, a shared region can be secured for communication between an application on the LPAR 220 managed by the host OS2 and the host OS1 (200).

This makes possible several processes such as communication between the host OS1 (200) and the application 232 on the host OS2, which use computer resources independent of each other.

The usage of the shared region is not limited to communication between the host OS1 (200) and the application 232 on the host OS2. It is also possible to apply the present invention to use the shared region for communications between the host OS2 and the application 232 or between the host OS2 and the agent 231.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer on which a plurality of operating systems run, comprising as computer resources:
   a processor;
   a memory coupled to the processor; and
   an I/O device coupled to the processor,
   the computer being coupled to a storage apparatus having a plurality of storage media,
   the plurality of operating systems including a first operating system configured to control access to the storage apparatus and a second operating system configured to generate at least one virtual computer,
   divided computer resources being allocated to the first operating system and the second operating system respectively,
   a third operating system for executing an application running on the at least one virtual computer,
   the second operating system having a shared region management part configured to manage a shared region that is a memory region used for communication between the application and the first operating system, and
   the third operating system having an agent configured to request the second operating system to secure the shared region based on a request from the application and map the secured shared region to a guest virtual address space indicating a position of a virtual memory allocated to the application.

2. The computer according to claim 1, wherein the second operating system includes a processing part configured to control the communication between the first operating system and the application using the shared region,
   wherein the shared region management part is configured to:
   secure the shared region of a prescribed size in a case of receiving a secure request for the shared region from the agent; and
   notify the agent of first addresses to access the secured shared region in a guest physical address space indicating a physical position of a logical memory included in the virtual computer,
   wherein the agent is configured to:
   map the secured shared region to the guest virtual address space using the first addresses; and
   notify the application of second addresses to access the shared region mapped to the guest virtual address space,
   wherein the application is configured to send a request to start a process using the shared region to the processing part via the agent after receiving the second address,
   wherein the processing part is configured to:
   obtain, from the shared region management part, third addresses to access the secured shared region in a host physical address space managed by the second operating system; and
   notify the first operating system of the third addresses, and
   wherein the first operating system is configured to communicate with the application using the third addresses, thereby executing the process using the shared region.

3. The computer according to claim 2, wherein the second operating system allocates, as the shared region, a part of a memory region allocated to the virtual computer in a case where the virtual computer is booted.

4. The computer according to claim 3, wherein the shared region management part is configured to:
   divide the shared region into a plurality of blocks and manage the plurality of blocks; and
   secure at least one block as the shared region provided for the application in a case of receiving the secure request for the shared region from the agent.

5. A memory region management method for a computer on which a plurality of operating systems run, the computer including, as computer resources, a processor; a memory coupled to the processor, and an I/O device coupled to the processor, the computer being coupled to a storage apparatus having a plurality of storage media, the plurality of operating systems including a first operating system configured to control access to the storage apparatus and a second operating system configured to generate at least one virtual computer, divided computer resources being allocated to the first operating system and the second operating system respectively, a third operating system for executing an application running on the at least one virtual computer, the memory region management method including:

a first step of issuing, by the application, a secure request for a shared region that is a memory region used for communication between the application and the first operating system via the third operating system;

a second step of securing, by the second operating system, the shared region based on the secure request for the shared region; and a third step mapping, by the third operating system, the secured shared region to a guest virtual address space indicating a position of a virtual memory allocated to the application.

6. The memory region management method according to claim 5, wherein the second step includes:

a step of securing the shared region of a prescribed size; and a step of notifying the application of first addresses to access the secured shared region in a guest physical address space indicating a physical position of a logical memory included in the virtual computer, wherein the third step includes:

a step of mapping the secured shared region to the guest virtual address space using the first addresses; and a step of notifying the application of second addresses to access the shared region mapped to the guest virtual address space, wherein the memory region management method further includes:

a step of sending, by the application, a request to start a process using the shared region to the second operating system via the third operating system after receiving the second address;

a step of obtaining, by the second operating system, third addresses to access the secured shared region in a host physical address space managed by the second operating system in a case of receiving the request to start the process;

a step of notifying, by the second operating system, the first operating system of the third addresses; and a step of communicating, by the first operating system, with the application using the third addresses to execute the process using the shared region.

7. The memory region management method according to claim 6, further including a step of allocating, by the second operating system, as the shared region, a part of a memory region allocated to the virtual computer in a case where the virtual computer is booted.

8. The memory region management method according to claim 7, further including a step of dividing, by the second operating system, the shared region into a plurality of blocks and managing the plurality of blocks, wherein the second step includes a step of securing at least one block as the shared region for the application.

* * * * *